US011267296B2

(12) United States Patent
Jacobs et al.

(10) Patent No.: US 11,267,296 B2
(45) Date of Patent: Mar. 8, 2022

(54) TIRE TREAD INCLUDING SERRATIONS IN RECESSED POCKETS OF GROOVE SIDEWALL

(71) Applicant: COOPER TIRE & RUBBER COMPANY, Findlay, OH (US)

(72) Inventors: Jeremy J. Jacobs, Findlay, OH (US); Patrick J. Bonifas, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 247 days.

(21) Appl. No.: 16/411,624

(22) Filed: May 14, 2019

(65) Prior Publication Data

US 2019/0263189 A1    Aug. 29, 2019

Related U.S. Application Data

(63) Continuation of application No. 15/035,916, filed as application No. PCT/US2014/064543 on Nov. 7, 2014, now Pat. No. 10,308,081.

(Continued)

(51) Int. Cl.
*B60C 11/13* (2006.01)
*B60C 11/03* (2006.01)
*B60C 11/12* (2006.01)

(52) U.S. Cl.
CPC ...... *B60C 11/1323* (2013.01); *B60C 11/0306* (2013.01); *B60C 11/1307* (2013.01); *B60C 2011/0341* (2013.01); *B60C 2011/1213* (2013.01); *B60C 2011/133* (2013.01); *B60C 2011/1338* (2013.01)

(58) Field of Classification Search
CPC ............ B60C 11/1307; B60C 11/1315; B60C 2011/133; B60C 2011/1338; B60C 11/1323
See application file for complete search history.

(56) References Cited

U.S. PATENT DOCUMENTS

D115,834 S    7/1939  Lambourn
D154,423 S    7/1949  Ofensend
(Continued)

FOREIGN PATENT DOCUMENTS

EP      0 393 873 B1   6/1995
GB         460338      1/1937
JP     2012 183944 A   9/2012

OTHER PUBLICATIONS

PCT/US2014/064543, International Search Report and Written Opinion, dated Feb. 13, 2015.
(Continued)

*Primary Examiner* — Robert C Dye
(74) *Attorney, Agent, or Firm* — Fay Sharpe LLP

(57) ABSTRACT

A tire includes first and second laterally spaced sides and a tread interposed between the first and second sides. The tread includes a tread surface having at least one groove therein, the at least one groove including facing, first and second sidewalls separated by a groove bottom surface. A first pocket region of recessed serrations extends over at least a portion of the first sidewall and a second pocket region of recessed serrations extends over at least a portion of the second sidewall. The serrations of the first and second pocket regions are staggered in a circumferential direction relative to one another.

12 Claims, 7 Drawing Sheets

Related U.S. Application Data

(60) Provisional application No. 61/903,152, filed on Nov. 12, 2013.

(56) References Cited

U.S. PATENT DOCUMENTS

| | | |
|---|---|---|
| 4,630,661 A | 12/1986 | Stelzer |
| 5,031,680 A | 7/1991 | Kajikawa et al. |
| 5,386,861 A | 2/1995 | Overhoff et al. |
| 5,535,798 A | 7/1996 | Nakamura |
| 6,681,824 B2 | 1/2004 | Lopez |
| 7,543,617 B2 | 6/2009 | Matsumoto |
| 8,006,730 B2 | 8/2011 | Ohara |
| 8,042,584 B2 | 10/2011 | Takahashi |
| 8,047,244 B2 | 11/2011 | Yoshikawa et al. |
| 8,281,830 B2 | 10/2012 | Ebiko |
| 8,365,783 B2 | 2/2013 | Minoli et al. |
| 2002/0017349 A1 | 2/2002 | Lopez |
| 2003/0102064 A1 | 6/2003 | Below |
| 2008/0047644 A1 | 2/2008 | Yoshikawa et al. |
| 2008/0271826 A1 | 11/2008 | Maxwell et al. |
| 2008/0271827 A1 | 11/2008 | Morrison et al. |
| 2010/0206446 A1 | 8/2010 | Oizumi |
| 2016/0280013 A1* | 9/2016 | Jacobs ................ B60C 11/1323 |

OTHER PUBLICATIONS

EP 14 18 2848 Supplementary European Search Report, dated May 23, 2017.

* cited by examiner

|  | Minimum | Maximum |
|---|---|---|
| Groove Depth (GD) | 0.100 | 1.00 |
| Snow Claw Depth (SD) | 0.050 | 1.00 |
| A | 0.020 | 0.750 |
| B | 0.00 | 0.900 |
| C | -10° | 120° |
| D | -10° | 75° |
| ANG | 0° | 75° |
FIG. 8
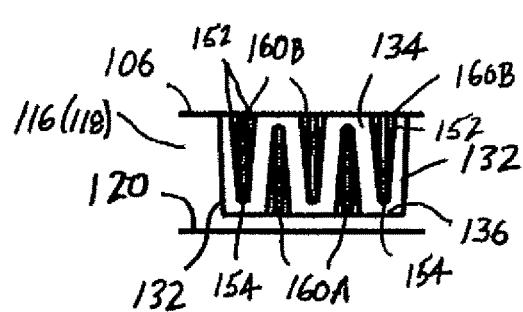
FIG. 9
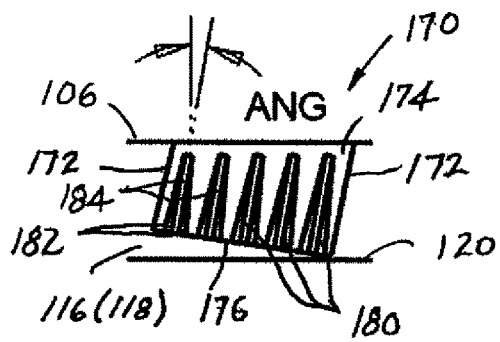
FIG. 10

TIRE TREAD INCLUDING SERRATIONS IN RECESSED POCKETS OF GROOVE SIDEWALL

This application is a continuation of U.S. application Ser. No. 15/035,916, which was filed on May 11, 2016 as a Submission Under 35 U.S.C. 371 of International Application No. PCT/US2014/064543, filed Nov. 7, 2014 claiming the priority benefit of U.S. Provisional Application No. 61/903,152, filed Nov. 12, 2013, the disclosures of each expressly incorporated herein.

BACKGROUND

The disclosure relates to an automotive tire, and specifically to a tread thereof. It finds application in a tire that exhibits improved traction, namely engagement of snow in the tread, desired hydroplane performance, handling, and reduced noise generation, and will be described with reference thereto. However, one will appreciate that the exemplary embodiments as shown and described below are amenable to other like applications and that may use one or more of the predicted performance benefits.

Commonly owned U.S. Pat. No. 6,986,372-Below discloses a tire in which at least selected grooves have serrated sidewalls. Specifically, all or a major portion of the surface of the sidewalls facing the groove includes the serrations. The serrations terminate short of a groove base or bottom surface. Tires employing these features have met with commercial success. Likewise, commonly owned U.S. Ser. No. 14/049,675, filed 9 Oct. 2013, discloses a tire tread with angled rib groove walls.

There is a continued need for improved performance such as traction, noise, handling, control, braking, etc., and particularly in connection with improved performance in snow without adversely impacting hydroplane resistance.

BRIEF DESCRIPTION

A tire with improved performance in snow is disclosed.

The tire includes first and second laterally spaced sides. A tread is interposed between the first and second sides, and the tread includes a tread surface having at least one groove therein, the at least one groove including facing, first and second sidewalls separated by a groove bottom surface, and a first pocket region of recessed serrations extending over at least a portion of the first sidewall and a second pocket region of recessed serrations extending over at least a portion of the second sidewall, the serrations of the first and second pocket regions being staggered in a circumferential direction relative to one another.

In an exemplary embodiment, the serrations of the first and second pocket regions partially overlap in the circumferential direction relative to one another.

In one arrangement, the serrations in the first and second regions extend substantially perpendicular to the groove bottom surface.

The serrations extend over less than a full height of their associated pocket region, or over substantially a same height as their associated pocket region.

The serrations are circumferentially spaced from one another in their associated pocket region.

The serrations extend at an angle between 0 and 180 degrees relative to the groove bottom surface and/or relative to a bottom wall of the associated pocket.

At least one of the serrations is interleaved with another one of the serrations.

A cross-section of the serration varies as the serration extends over a height of the pocket region.

A face of the first pocket region extends at an angle relative to the groove bottom surface that is different than an angle at which the first sidewall extends relative to the groove bottom surface, and preferably at an angle less than that of the first sidewall.

The serrations in a first pocket region decrease in height in the circumferential direction.

End walls of the first pocket region are either parallel or non-parallel to one another.

The sidewalls of the groove are disposed at a non-perpendicular first angle relative to the bottom surface of the groove, and a circumferentially extending face of the pocket region is disposed at a non-perpendicular second angle relative to the bottom surface of the groove where the first angle is greater than the second angle.

The serrations do not protrude into the groove.

Serrations on opposite sidewalls of the groove are disposed in opposite directions from one another.

A height of the first pocket region changes as the first pocket region extends in the circumferential direction, and a height of the serrations changes as the serrations extend in the circumferential direction.

A primary benefit is improved tire performance, particularly in snow.

Still another advantage is associated with increased traction force from gripping a rib of snow in the contact patch of the tread.

Yet another feature is improved interlocking grip features without adversely interrupting water flow through a circumferential groove of the tire.

Still another benefit is a reduction in standing waves and an associated reduction in noise generation.

Still other benefits and features of the present disclosure will become apparent upon reading and understanding the following detailed description.

BRIEF DESCRIPTION OF THE DRAWINGS

FIG. 8 is a table of representative dimensional values associated with the features shown in FIG. 9.

FIG. 9 is a plan view similar to FIG. 6 of an alternate arrangement of serrations.

FIG. 10 is a plan view similar to FIGS. 6 and 9 of another arrangement of serrations.

DETAILED DESCRIPTION

Figure 1:
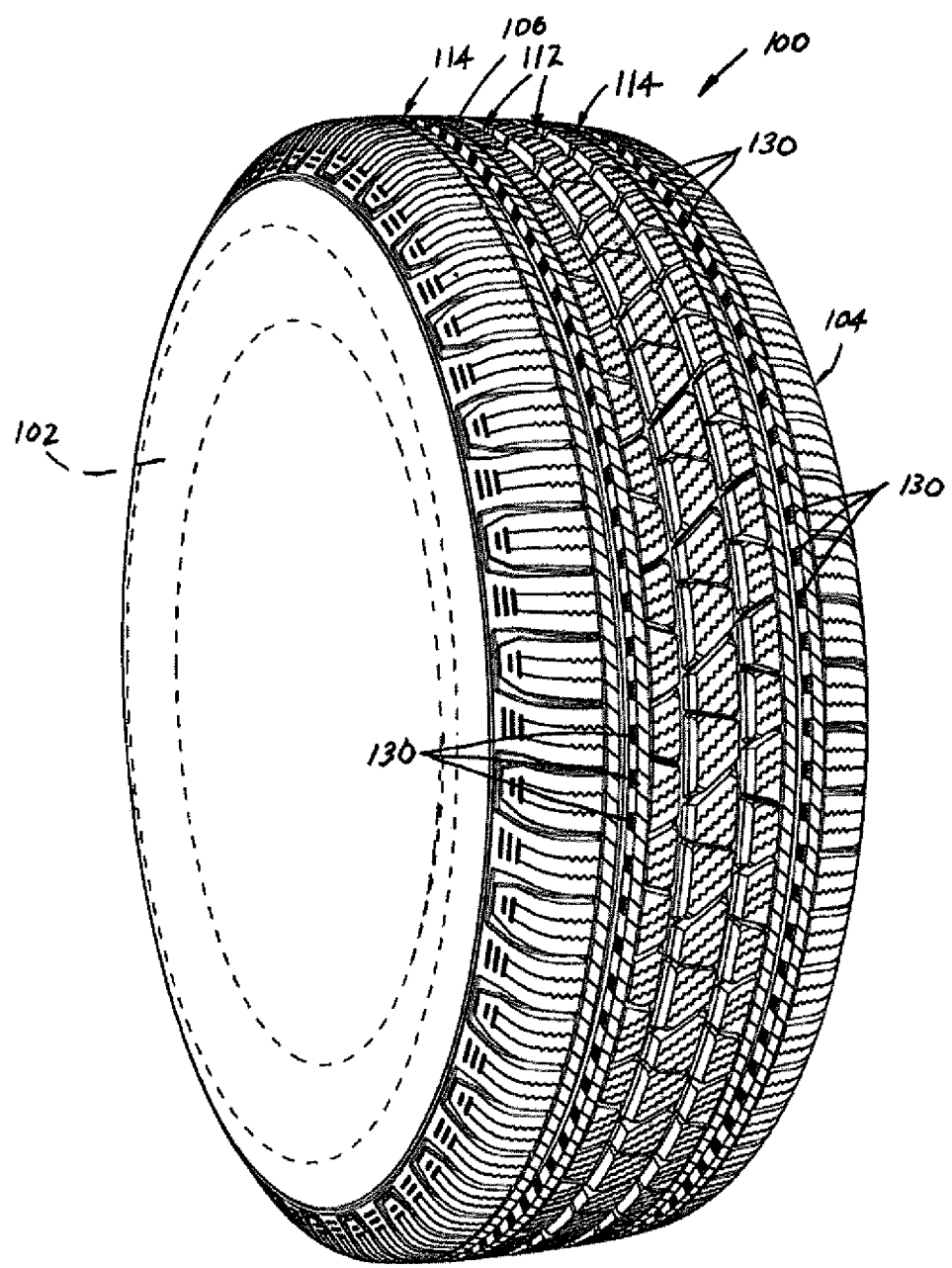
FIG. 1 is a perspective view of a tire includes one or more grooves that include pockets having serrations therein.
Figure 2:
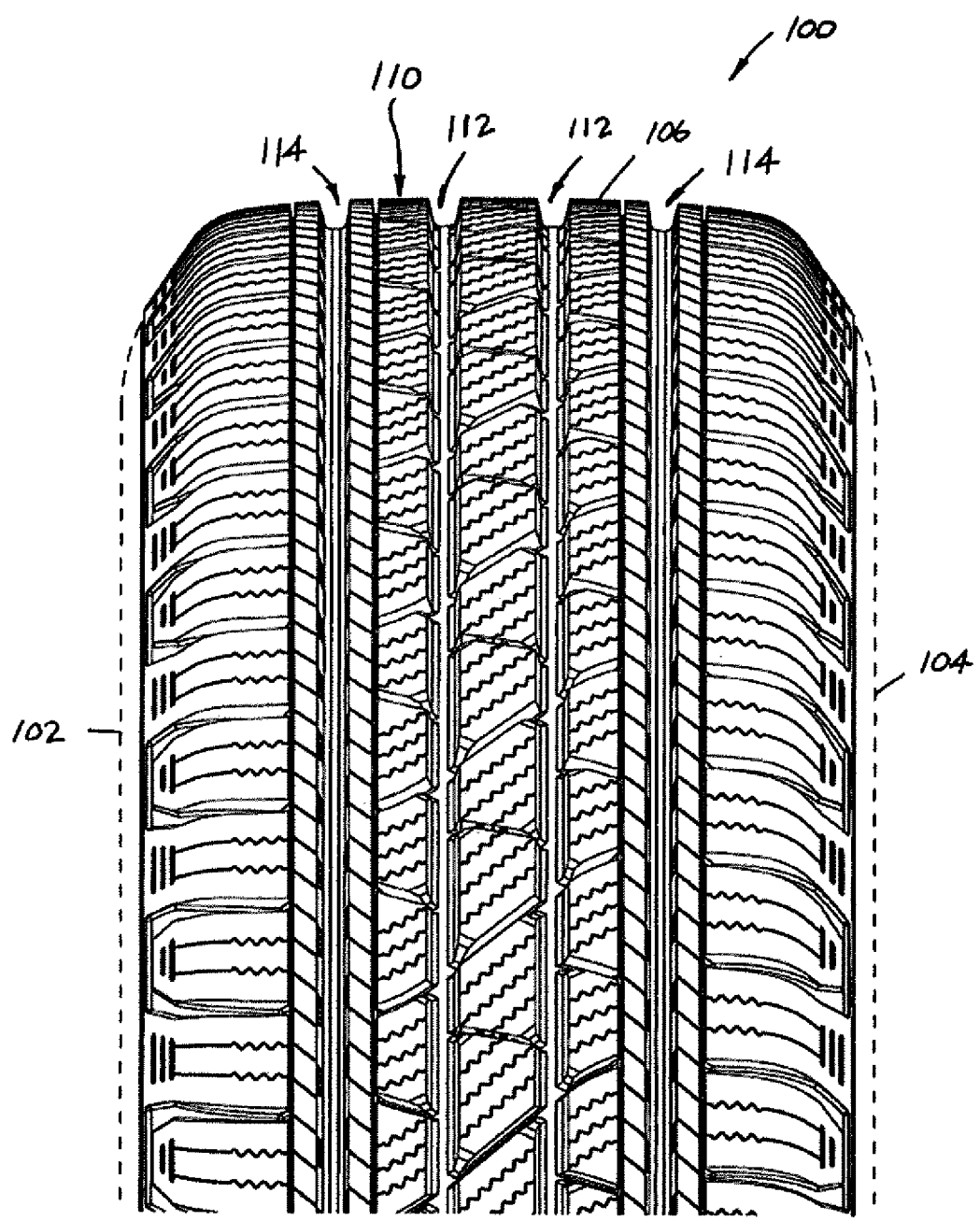
FIG. 2 is an enlarged front plan view of a portion of the tire of FIG. 1.

FIGS. 1 and 2 generally illustrate a tire or pneumatic tire 100 that includes a first or outer side 102 and a second or inner side 104 that extend between a tread surface 106. For ease of illustration and understanding, selected portions of the sides 102, 104 are shown in broken line since those features are generally conventional and form no part of the present disclosure. Disposed between the first and second sides 102, 104 is a tire tread 110. The tread 110 is formed in a desired pattern and the pattern or tire tread design may differ depending on various needs and end uses as will be appreciated by one skilled in the art. Therefore, many of the illustrated features of the tread 110 will not be described since they form no part of the present disclosure, and instead the description will focus on those features associated with this disclosure.

Figure 3:
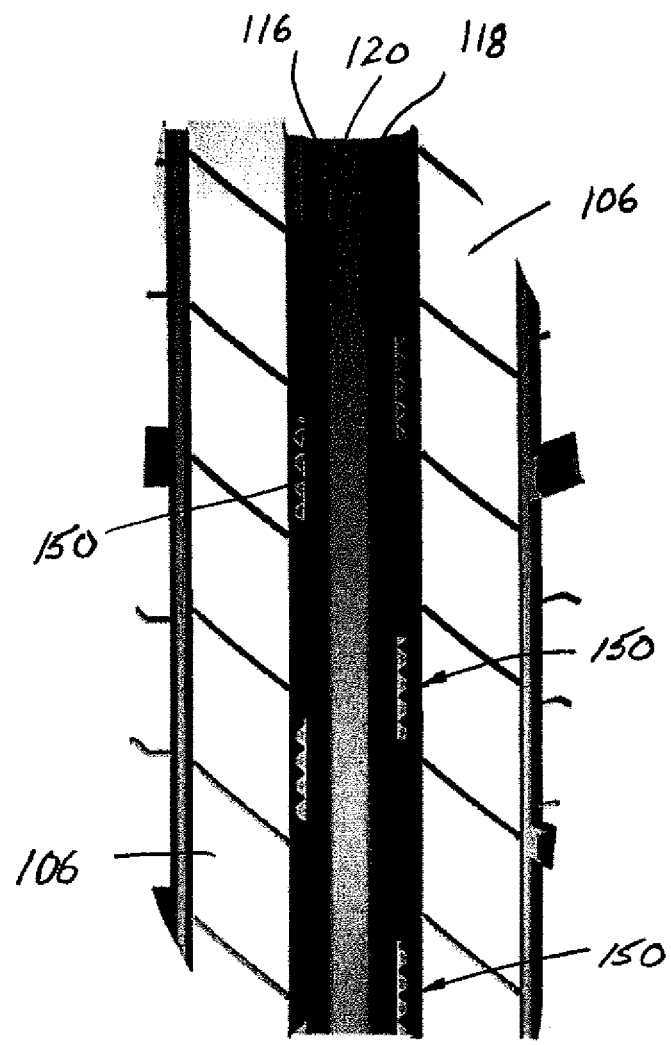
FIG. 3 is an enlarged plan view of one of the tire grooves shown in FIGS. 1 and 2.
Figure 4:
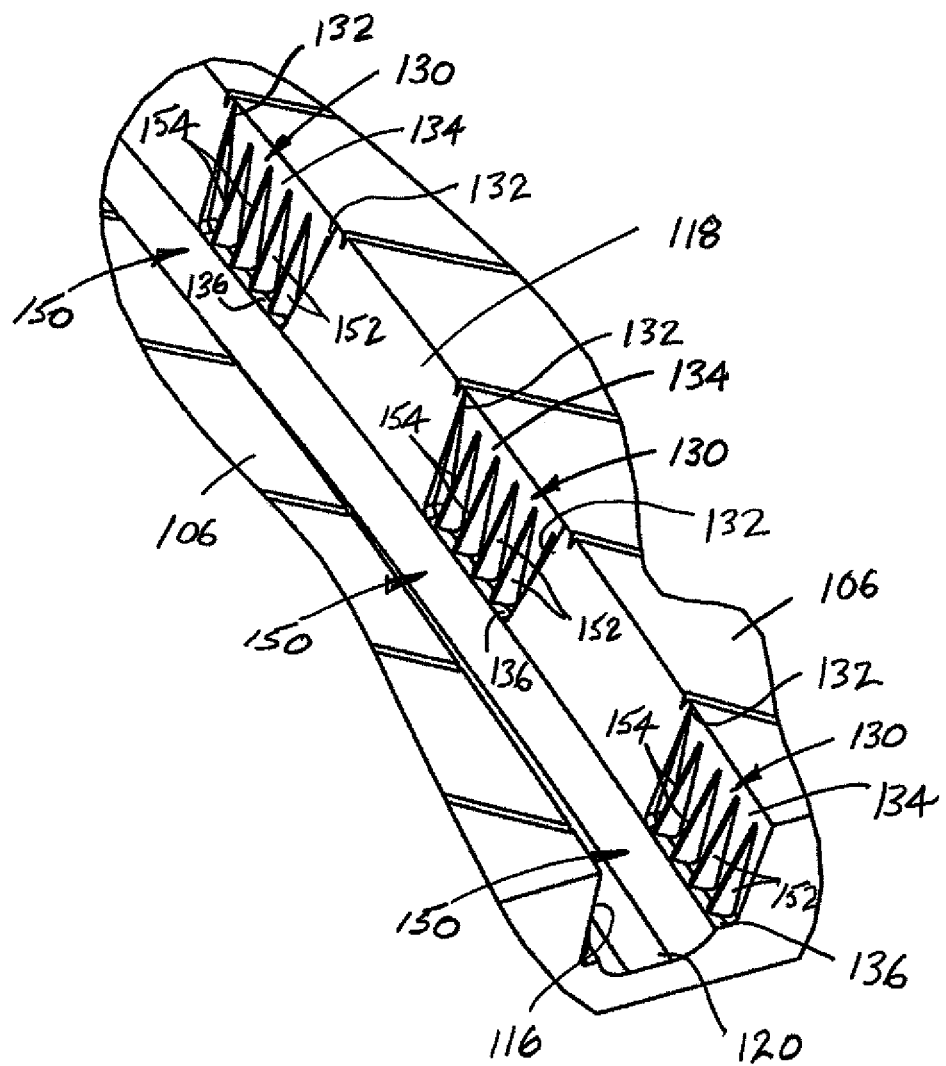
FIG. 4 is a perspective view of the tire groove of FIG. 3.

More particularly, there are two central grooves 112 that extend in a circumferential direction around the tire. In addition, first and second outer circumferential grooves 114 further separate the tread 110 into groups of tread block portions, although a greater or lesser number of grooves and tread block portions is also contemplated. As more particularly illustrated in FIGS. 3 and 4, each of the grooves is defined by first and second sidewalls 116, 118 disposed in facing relation and separated by a groove bottom wall or surface 120. At least one of the circumferential grooves 112, 114, and preferably the first and second outer grooves 114 as shown in the illustrated embodiment, include pockets 130 provided in the sidewalls 116, 118 of the grooves. The pockets 130 are circumferentially spaced along the sidewall 116, and likewise are preferably staggered relative to pockets 130 that are circumferentially spaced along the opposite, facing sidewall 118. Stated another way, the pockets in facing sidewalls 116, 118 separated by a bottom surface 120 of the groove are not spaced directly across from one another. Instead, the pockets 130 are staggered so that in a preferred arrangement there is a slight circumferential overlap between the pockets (FIG. 3). The degree of staggering or circumferential overlap may vary from one tire to another so that the present disclosure is not limited to a specific amount of overlap.

Figure 5:
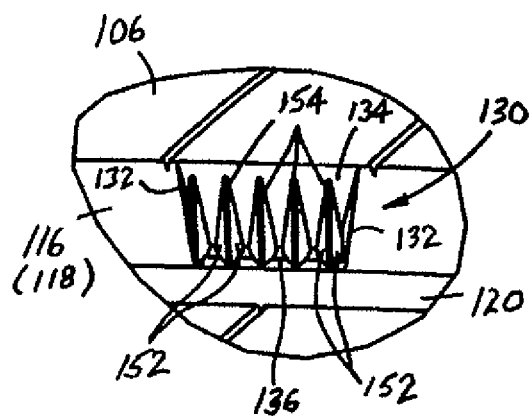
FIG. 5 is an enlarged view of the pocket and serrations in a groove sidewall.
Figure 6:
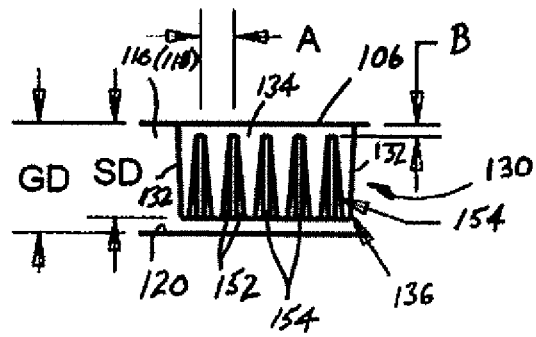
FIG. 6 is a plan view of the pocket and serrations in the groove sidewall.

With continued reference to FIGS. 1-4, and additional reference to FIGS. 5-6, one exemplary design for the pocket 130 is a generally trapezoidal recess defined by end walls 132 that angle away from one another as the end walls extend outwardly away from the bottom surface 120 of the groove, i.e., the end walls diverge from one another as the end walls extend radially outward. An inner face 134 of the pocket 130 extends upwardly from a bottom surface 136 and the inner face extends at a different angle than an angle of the sidewalls 116, 118 of the circumferential groove. As evident in FIG. 4, the angle of the inner face 134 of the pocket 130 is less than the angle of the sidewall (also referred to as the draft of the groove sidewall) 116 or 118 as measured from a plane perpendicular to the bottom surface 120 of the groove. A top of the pocket may or may not coincide with the surface 106 of the tread.

A series of serrations 150 are provided in each pocket 130. The serrations 150 are preferably circumferentially spaced or spaced at a pitch within the pocket 130 between the end walls 132 (and shown here as being evenly spaced from one another between the end walls), extend upwardly from the bottom surface 136, and in this arrangement the serrations terminate at a height below the surface 106 of the tread. Each serration 150 is formed by angled walls 152 that converge to form a peak 154, although other cross-sections may be used. The illustrated peaks 154 extend from an intersection between the bottom surface 136 of the pocket and intersect with the face 134 of the pocket at a location inwardly of the tread surface 106. In this manner, the serrations 150 do not extend outwardly into the cross-section of the groove where the groove is defined by the sidewalls 116, 118 that diverge outwardly from the bottom surface 120 of the groove. As is also evident in FIGS. 1-4, and more particularly in FIGS. 5-6, the serrations 150 extend outwardly in a generally perpendicular direction from the bottom surface 120 of the groove, and in this instance the serrations also extend in a direction substantially perpendicularly outward from the bottom surface 136 of the pocket 130 (FIG. 6).

Figure 7:
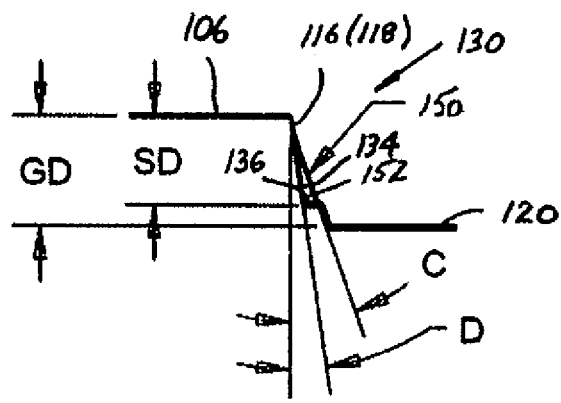
FIG. 7 is a cross-sectional view through a pocket of the groove sidewall.
Figure 11:
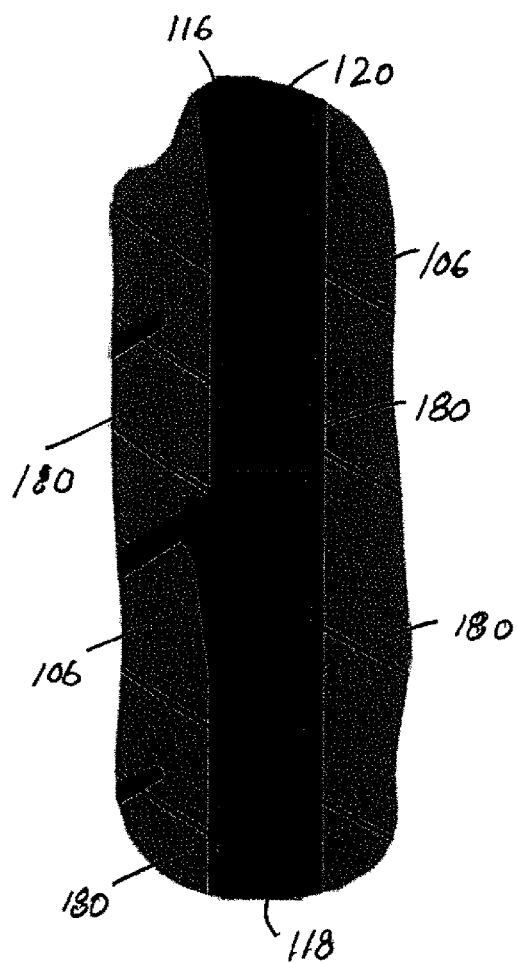
FIG. 11 is a plan view of a groove with an alternative arrangement of serrations in pockets of the groove sidewalls.
Figure 12:
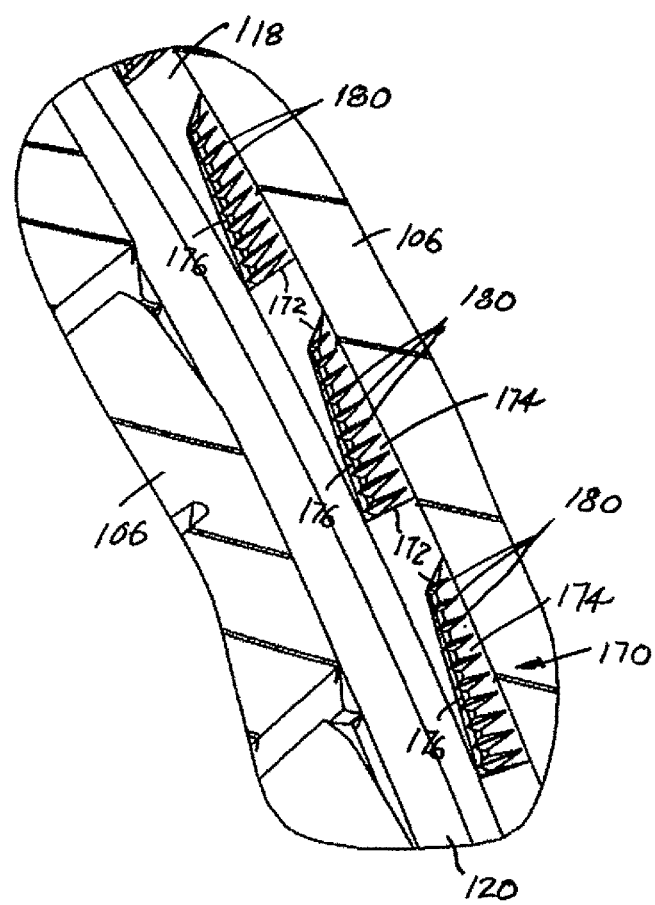
FIG. 12 is a perspective view of one of the sidewalls shown in FIG. 11.

FIGS. 7 and 8 provide representative dimensions in connection with the groove, sidewall 116 or 118, pocket 130, and serrations 150. It will be appreciated that these dimensions are exemplary only and not deemed to be limiting. As illustrated, the groove depth GD may range from about 0.100" to about 1.00", where the groove depth is measured between the surface 106 of the tire tread and the bottom channel 120. A serration depth SD ranges from approximately 0.0502" to approximately 1.00 inches where serration depth is measured from the surface 106 of the tread to the bottom surface 136 of the pocket. A pitch A is measured between adjacent peaks of the individual serrations 150. The pitch A may range from a minimum of approximately 0.020" to approximately 0.750". Dimension B represents the spacing between surface 106 of the tire tread and the location where the peaks 150 intersect with the face 134, i.e., that dimension that the peaks are spaced from the tread surface 106. This dimension B may range from no spacing (0.00") to approximately 0.900". In addition, angle C is that angle measured between the peak and a plane extending perpendicularly from the surface 106 of the tread (FIG. 7). Oftentimes, this angle will be the same as that associated with the angle of the sidewall when measured relative to a plane extending perpendicularly from the bottom wall 120 of the groove. The angle C ranges from −10° to approximately 120°. Angle D is measured between the plane extending perpendicularly from the surface 106 of the tread and face 134 of the pocket 130.

FIG. 9 illustrates a modified arrangement in which some of the serrations 160A intersect with the bottom surface 136 of the pocket 130 and extend upwardly toward the tread surface but terminate below the tread surface 106 while other serrations 160B extend downwardly from the tread surface and terminate prior to reaching the bottom surface 136 of the pocket. Further, the serrations 160A, 160B are interleaved with one another to define alternating upwardly and downwardly extending serrations. In this instance, each of the peaks 154 formed by the intersecting walls 152 of the serrations are disposed generally perpendicular to the bottom surface 136 of the pocket, and likewise generally perpendicular to the bottom surface 120 of the groove. Further, the serrations 160A, 160B are circumferentially spaced from one another between the end walls 132. Again, however, it is intended that the serrations 160A, 160B do not extend into the cross-sectional area of the groove as defined by sidewalls 116, 118, and bottom wall 120.

Figure 13:
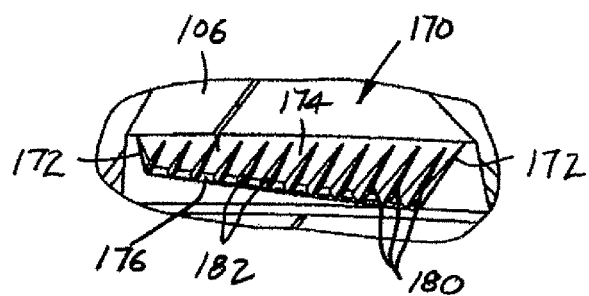
FIG. 13 is an enlarged view of one of the pocket and serrations in the groove sidewall of FIGS. 11-12.

Yet another modification is shown in FIGS. 10-13. Here, pockets 170 are differently shaped and may include parallel end walls 172 (FIG. 10) or the end walls may diverge (see (FIGS. 12-13) and a bottom wall 176 that is inclined or angled relative to the bottom surface 120 of the groove. As evident in FIG. 10, the serrations 180 extend upwardly from the bottom wall 176 of the pocket 170 and the serrations terminate and intersect with the face 174 of the pocket at a location spaced radially inward from the tread surface 106. Because the peaks 184 of the serrations 180 extend generally perpendicular or normal to the bottom wall 176 of the pocket, the peaks are inclined or angled relative to the bottom surface 120 of the groove. In the embodiment of FIG. 10, the pocket is angled relative to normal as represented by the angle ANG. This angle ANG may range from 0° to about 75°. As best illustrated in FIG. 13, the serrations 180 are thus angled relative to the bottom surface 120 of the groove.

It is preferred that the angles of the serrations 180 on the opposing faces 116, 118 of a groove be oriented in opposite directions. Further, because the serrations 180 on the opposing faces 116, 118 are oriented in opposite directions, the height of the serrations are different on the opposing faces in the circumferential direction. That is, the serrations 180 in a given pocket 170 increase in height on one face and decrease in height on the opposite face as one proceeds in a circumferential direction of the groove. Once again, and as perhaps most evident in FIG. 11, the serrations 180 provided in pockets 170 of the sidewalls 116, 118 are disposed in a circumferentially staggered, partially overlapping arrangement.

The recessed pockets (130, 170) with serrations (150, 180) grip into a rib of snow formed in a contact patch of the tire tread. The interlocking between the serrations (150, 180) and the rib of snow increases the traction force from snow shear. Lengthening the serrated pockets (130, 170) maximizes the engagement area. Further, orienting the pockets (130, 170) on adjacent, facing groove walls 116, 118 in opposite directions relative to one another enhances the captive engagement of snow in the tread. While larger tread features may provide more interlocking and increased traction with snow shear, a potential trade-off could be hydroplane resistance due to an interrupted water flow through the main circumferential grooves. One feature of the present disclosure is that the pockets (130, 170) are recessed into the circumferential groove walls 116, 118 and the serrations (150, 180) do not protrude into the main channel formed by the circumferential grooves. This configuration does not significantly interrupt water flow through the circumferential groove but advantageously still provides interlocking grip features when the groove is filled with snow. Is also believed that the serrations (150, 180) may prevent standing waves forming and reduce generated noise.

A number of modifications will be readily apparent to one skilled in the art. For example, the top of the pocket may or may not coincide with the top edge of the main groove wall. Likewise, the draft angle on a wall that incorporates the pockets/serrations can be different than the draft angle of the main groove. The depth or thickness of the serrations would necessarily vary from an increased depth or thickness adjacent the bottom of the pocket, and reduce in depth or thickness adjacent the top of the pocket. Further, a preferred form of serrations is defined by a pair of angularly disposed walls or surfaces that intersect to form the peaks. It will be appreciated that the cross-section of the serrations may vary in shape, as well as in depth or thickness as noted above. However, it is preferred that the serrations not protrude from the wall of the pocket or into the groove channel. As also briefly noted above, the pocket in the groove sidewall can adopt a wide variety of shapes, and need not be necessarily symmetric or trapezoidal as shown in the illustrated embodiments. It is also envisioned that various combinations of these features may be used, and the present disclosure should not be limited simply to the illustrated combinations of features.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution. It will also be appreciated that not all of the tread features such as all of the grooves, nor all of the ribs, etc. in the illustrated tire tread, have been identified by reference numerals for ease of illustration. However, similar features or components that are repeated in the tire tread design are structurally or functionally identical or equivalent to that described above unless particularly noted otherwise.

The invention claimed is:

1. A tire comprising:
    first and second axially spaced sides; and
    a tread interposed between the first and second sides, the tread including a tread surface having at least one groove therein that includes facing first and second sidewalls separated by a groove bottom surface, and a first pocket region extending over only a portion of a height of the first sidewall, the first pocket region having first and second end walls longitudinally spaced along a length of the groove that are interconnected by a bottom wall spaced radially inward from the ground engaging surface and an inner face that is axially recessed from the first sidewall, and serrations formed by angled walls extending from the inner face that converge to form a peak that is disposed generally perpendicular to at least one of the groove bottom surface and the bottom wall of the first pocket region extending over at least a portion of a height of the first pocket region where the serrations are recessed in the first pocket region, extending outwardly from the inner face of the first pocket region, and do not extend outwardly beyond the first sidewall into the groove.

2. The tire of claim 1 wherein the bottom wall of the first pocket region is inclined at an angle relative to the bottom surface of the groove.

3. The tire of claim 2 wherein the serrations extend perpendicular to the bottom wall of the first pocket region.

4. The tire of claim 2 wherein the serrations extend perpendicular to the bottom surface of the groove.

5. The tire of claim 1 wherein the tread includes individual tread blocks and the groove extends between adjacent tread blocks.

6. The tire of claim 1 wherein the groove extends in a substantially circumferential direction around the tire.

7. The tire of claim 1 wherein the groove extends in a substantially axial direction of the tire.

8. The tire of claim 1 wherein the bottom wall of the first pocket region is parallel to the bottom surface of the groove.

9. The tire of claim 1 wherein the serrations have a variable height from the inner face from the bottom wall of the pocket region to the ground engaging surface of the tread.

10. The tire of claim 9 wherein at least some of the serrations increase in height as the serrations extend radially from the bottom wall of the first pocket region to the ground engaging surface of the tread.

11. The tire of claim 10 wherein the serrations alternate in a pattern of increasing and decreasing height as the individual serrations extend radially from the bottom wall of the first pocket region to the ground engaging surface of the tread.

12. The tire of claim 9 wherein the serrations extend radially from the bottom wall of the first pocket region and terminate below the ground engaging surface of the tread.

\* \* \* \* \*